United States Patent
Guo (10) Patent No.: US 11,400,485 B2
(45) Date of Patent: Aug. 2, 2022

(54) BAKING METHOD, DEVICE AND BAKING OVEN

(71) Applicants: HKC Corporation Limited, Shenzhen (CN); Chongqing HKC Optoelectronics Technology Co., ltd., Chongqing (CN)

(72) Inventor: Xiaobin Guo, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 38 days.

(21) Appl. No.: 16/958,857

(22) PCT Filed: Dec. 28, 2018

(86) PCT No.: PCT/CN2018/124607
§ 371 (c)(1),
(2) Date: Jun. 29, 2020

(87) PCT Pub. No.: WO2019/134582
PCT Pub. Date: Jul. 11, 2019

(65) Prior Publication Data
US 2021/0069746 A1   Mar. 11, 2021

(51) Int. Cl.
*B05D 3/02* (2006.01)
*F27B 9/00* (2006.01)
*G02F 1/1333* (2006.01)
*F27B 9/14* (2006.01)
*G02F 1/1337* (2006.01)

(52) U.S. Cl.
CPC .............. *B05D 3/0272* (2013.01); *F27B 9/00* (2013.01); *F27B 9/14* (2013.01); *G02F 1/1333* (2013.01); *G02F 1/133302* (2021.01); *G02F 1/133723* (2013.01)

(58) Field of Classification Search
CPC ................................ B05D 3/0272; F27B 9/14
See application file for complete search history.

(56) References Cited

U.S. PATENT DOCUMENTS

2010/0167224 A1* 7/2010 Nakano ............. H01L 21/67034
432/246
2013/0067761 A1* 3/2013 Zhu ........................ F26B 25/10
34/237

\* cited by examiner

*Primary Examiner* — Tabatha L Penny
(74) *Attorney, Agent, or Firm* — WPAT, PC (57) ABSTRACT

The present application is applicable to the field of material making, and there is provided a baking method, device and baking oven including: acquiring a predetermined instruction, and starting timing and cycling the following steps: controlling a first set of pins to support a substrate from an initial position and recording the rising times of the first set of pins; raising the first set of pins to a first preset position, and controlling the first set of pins to move a first preset distance in a first preset direction, wherein the first preset distance is associated with the rising times of the first set of pins; controlling the lowering of the first set of pins such that a second set of pins supports the substrate; and controlling the first set of pins to return to the initial position, when the first set of pins drops to a second preset position.

7 Claims, 6 Drawing Sheets

Fig. 6

BAKING METHOD, DEVICE AND BAKING OVEN

FIELD OF THE DISCLOSURE

The present disclosure relates to a material making field, and more particularly to a baking method, a device and a baking oven.

BACKGROUND OF THE DISCLOSURE

In the liquid crystal display panel manufacturing process, it is necessary to form a film on a glass substrate. For example, a polyimide film (PI film) was prepared on a glass substrate. The PI film is a guide film or an alignment film which enables the liquid crystal molecules in the liquid crystal display panel to be arranged in a pretilt angle.

The PI film is obtained by pre-baking the glass substrate after the PI solution is applied on the glass substrate. The pre-baking may be achieved by heating the pins to alternatively contact the glass substrate. However, the shrinkage rate of the film formed by heating the PI solution will cause the LCD display panel brightness uneven and other traces of the phenomenon due to uneven heating.

SUMMARY OF THE DISCLOSURE

In view of this, the present application provides a baking method, a device and a baking oven to solve the traces of unevenness in brightness of the liquid crystal display panel due to uneven heating of the associated baking method.

An aspect of an embodiment of the present application provides a baking method, including:

acquiring a predetermined instruction, and starting timing and cycling the following steps:

controlling a first set of pins to support a substrate from an initial position and recording the rising times of the first set of pins;

raising the first set of pins to a first preset position, and controlling the first set of pins to move a first preset distance in a first preset direction, such that the substrate moves the first preset distance in the first preset direction, wherein the first preset distance is associated with the rising times of the first set of pins;

controlling a lowering of the first set of pins such that a second set of pins supports the substrate; and controlling the first set of pins to return to the initial position, when the first set of pins drops to a second preset position.

In one of the embodiments, the predetermined instruction refers to an instruction of start baking, and the start timing refers to start timing when acquired the instruction of start baking.

In one of the embodiments, the distance of the first set of pins raising from the initial position to the first preset position may be equal to a dropping distance of the first set of pins dropping from the first preset position to the second preset position.

In one of the embodiments, after the first set of pins returning to the initial position, the method further includes:

acquiring a time record when the time record is equal to or greater than a preset time, resetting the time record and the rising times of the first set of pins to an initial value, and restarting timing and cyclically performing the following steps:

controlling the first set of pins to support the substrate from the initial position and recording the rising times of the first set of pins;

raising the first set of pins to the first preset position, and controlling the first set of pins to move a second preset distance in a second preset direction, such that the substrate moves the second preset distance in the second preset direction, wherein the second preset distance is associated with the rising times of the first set of pins;

controlling the lowering of the first set of pins such that the second set of pins supports the substrate;

controlling the first set of pins to return to the initial position, when the first set of pins drops to the second preset position;

acquiring for the time record, and discharging the substrate when the time record is equal to or greater than the preset time.

In one of the embodiments, the first preset distance associated with the rising times of the first set of pins is:

$$L_i = x, (i=1)$$

$$L_i = 2x, (i=2,3,4,\ldots)$$

wherein $L_i$ represents the first preset distance, and i represents the rising times of the first set of pins.

In one of the embodiments, the initial value being 0 and the second preset distance associated with the rising times of the first set of pins is:

$$R_i = x, (i=1)$$

$$R_i = 2x, (i=2,3,4,\ldots)$$

wherein $R_i$ represents the second preset distance, and i represents the rising times of the first set of pins.

In one of the embodiments, the preset time is ½ of the baking time.

In one of the embodiments, the baking time is man-made.

A further aspect of an embodiment of the present application provides a baking device, including:

a first acquisition unit for acquiring a predetermined instruction, and starting timing and controlling the following unit cycle operation:

a first ascending control unit for controlling a first set of pins to support a substrate from an initial position and recording the rising times of the first set of pins;

a first movement control unit for raising the first set of pins to a first preset position, and controlling the first set of pins to move a first preset distance in a first preset direction, such that the substrate moves the first preset distance in the first preset direction, wherein the first preset distance is associated with the rising times of the first set of pins;

a first descent control unit for controlling the lowering of the first set of pins such that a second set of pins supports the substrate;

a first return control unit for controlling the first set of pins to return to the initial position when the first set of pins drops to the second preset position.

In one of the embodiments, the baking device further includes:

a second acquisition unit for acquiring a time record after the first set of pins returning to the initial position, when the time record is equal to or greater than a preset time, resetting the time record and the rising times of the first set of pins to an initial value, and restarting the timing and cyclically performing the following steps:

a second rising control unit for controlling the first set of pins to support the substrate from the initial position and recording the rising times of the first set of pins;

a second movement control unit for raising the first set of pins to the first preset position, and controlling the first set of pins to move a second preset distance in a second preset direction, such that the substrate moves the second preset distance in the second preset direction, wherein the second preset distance is associated with the rising times of the first set of pins;

a second descent control unit for controlling a lowering of the first set of pins such that the second set of pins supports the substrate;

a second return control unit for controlling the first set of pins to return to the initial position when the first set of pins drops to the second preset position;

and a discharge control unit for acquiring the time record, and discharging the substrate when the time record is equal to or greater than the preset time.

In one of the embodiments, the first preset distance associated with the rising times of the first set of pins is:

$$L_i=x, (i=1)$$

$$L_i=2x, (i=2,3,4,\ldots)$$

wherein $L_i$ represents the first preset distance, and i represents the rising times of the first set of pins.

In one of the embodiments, the initial value being 0 and the second preset distance associated with the rising times of the first set of pins is:

$$R_i=x, (i=1)$$

$$R_i=2x, (i=2,3,4,\ldots)$$

wherein $R_i$ represents the second preset distance, and i represents the rising times of the first set of pins.

In one of the embodiments, the preset time is ½ of the baking time.

Another aspect of the present application provides a baking device. The baking device includes a storage unit, a processing unit, and a computer program stored in the storage unit and operable on the processing unit, wherein the processing unit executes the computer program by performing the steps of:

acquiring a predetermined instruction, and starting timing and cycling the following steps:

controlling a first set of pins to support a substrate from an initial position and recording the rising times of the first set of pins;

raising the first set of pins to a first preset position, and controlling the first set of pins to move a first preset distance in a first preset direction, such that the substrate moves the first preset distance in the first preset direction, wherein the first preset distance is associated with the rising times of the first set of pins;

controlling a lowering of the first set of pins such that a second set of pins supports the substrate; and controlling the first set of pins to return to the initial position, when the first set of pins drops to a second preset position.

In one of the embodiments, the predetermined instruction refers to an instruction of start baking, and the start timing refers to start timing when acquired the instruction of start baking.

In one of the embodiments, the distance of the first set of pins raising from the initial position to the first preset position may be equal to a dropping distance of the first set of pins dropping from the first preset position to the second preset position.

In one of the embodiments, after the first set of pins returning to the initial position, the method further includes:

acquiring a time record when the time record is equal to or greater than a preset time, resetting the time record and the rising times of the first set of pins to an initial value, and restarting timing and cyclically performing the following steps:

controlling the first set of pins to support the substrate from the initial position and recording the rising times of the first set of pins;

raising the first set of pins to the first preset position, and controlling the first set of pins to move a second preset distance in a second preset direction, such that the substrate moves the second preset distance in the second preset direction, wherein the second preset distance is associated with the rising times of the first set of pins;

controlling the lowering of the first set of pins such that the second set of pins supports the substrate;

controlling the first set of pins to return to the initial position, when the first set of pins drops to the second preset position;

acquiring a time record, and discharging the substrate when the time record is equal to or greater than the preset time.

In one of the embodiments, the first preset distance associated with the rising times of the first set of pins is:

$$L_i=x, (i=1)$$

$$L_i=2x, (i=2,3,4,\ldots)$$

wherein $L_i$ represents the first preset distance, and i represents the rising times of the first set of pins.

In one of the embodiments, the initial value being 0 and the second preset distance associated with the rising times of the first set of pins is:

$$R_i=x, (i=1)$$

$$R_i=2x, (i=2,3,4,\ldots)$$

wherein $R_i$ represents the second preset distance, and i represents the rising times of the first set of pins.

In one of the embodiments, the preset time is ½ of the baking time.

Another aspect of an embodiment of the present application provides a computer-readable storage medium. The computer-readable storage medium storing a computer program. Wherein the computer program is implemented by one or more processors to implement the steps of the method described in the present application embodiments:

acquiring a predetermined instruction, and starting timing and cycling the following steps:

controlling a first set of pins to support a substrate from an initial position and recording the rising times of the first set of pins;

raising the first set of pins to a first preset position, and controlling the first set of pins to move a first preset distance in a first preset direction, such that the substrate moves the first preset distance in the first preset direction, wherein the first preset distance is associated with the rising times of the first set of pins;

controlling the lowering of the first set of pins such that a second set of pins supports the substrate;

controlling the first set of pins to return to the initial position, when the first set of pins drops to a second preset position.

In the embodiment of the present application, acquiring a predetermined instruction, and starting timing and cycling the following steps: controlling a first set of pins to support a substrate from an initial position and recording the rising times of the first set of pins; raising the first set of pins to a first preset position, and controlling the first set of pins to move a first preset distance in a first preset direction, such that the substrate moves the first preset distance in the first preset direction, wherein the first preset distance is associated with the rising times of the first set of pins; controlling a lowering of the first set of pins such that a second set of pins supports the substrate; and controlling the first set of pins to return to the initial position, when the first set of pins drops to a second preset position. To prevent the same pins and the substrate at the same location repeated contact or prolonged contact, so that the various locations of the substrate heating time consistent, effectively overcome the baking process of uneven heating problems.

BRIEF DESCRIPTION OF THE DRAWINGS

In order to more clearly illustrate the technical solution in the embodiments of the present application, the drawings to be used in the description of the embodiments or related art will be briefly described below. It will be apparent that the drawings in the following description are merely examples of the present application and that other drawings may be obtained by those of ordinary skill in the art without departing from the creative work of the present disclosure.

DETAILED DESCRIPTION OF PREFERRED EMBODIMENTS

In the following description, for the purpose of illustration and not by way of limitation, specific details such as specific system structures, techniques and the like are set forth in order to provide a thorough understanding of the embodiments of the present application. However, it will be apparent to those skilled in the art that the present application may be practiced in other embodiments without these specific details. In other instances, detailed descriptions of well-known systems, devices, circuits, and methods are omitted to avoid unnecessarily obscuring the description of the present application.

It is to be understood that when used in this specification and in the appended claims, the term "including"; indicates the presence of the described features, integers, steps, operations, elements and/or components, but does not preclude the presence or addition of one or more other features, integers, steps, operations, elements, components and/or collections thereof.

It is also to be understood that the terminology used herein in this specification is for the purpose of describing particular embodiments only and is not intended to be limiting of the present application. As used in this specification and the appended claims, the singular forms "a", "an" and "the" are intended to include the plural forms unless the context clearly dictates otherwise.

It should also be further understood that, the term "and/or" as used in the specification and the appended claims refers to any combination of one or more of the items listed in association and all possible combinations and include such combinations.

As used in this specification and the appended claims, the term "if" may be interpreted as "when" or "once" or "responded to" or "responded by detection". Similarly, the phrase "if determined" or "if determined [described condition or event]" may be interpreted in terms of context as meaning "once determined" or "in response to" or "once the [described condition or event] is detected" or "in response to detecting [described condition or event]".

In order to illustrate the technical solution described in the present application, the following description will be made by way of specific examples.

Before describing the specific examples, the polyimide film (PI film) is introduced first. PI film has high resistance to high temperature, radiation resistance, chemical corrosion and electrical insulation properties, can be 250~280° C. air long-term use, and PI chemical stability, without adding flame retardant can prevent combustion. Therefore, PI film is particularly suitable for flexible printed circuit board substrate and a variety of high temperature electrical insulation materials.

Common, such as used in liquid crystal display panel preparation. Pre-baking of PI is a key step in the preparation of the liquid crystal display panel. After the PI solution is uniformly applied to the glass substrate, the glass substrate coated with PI is pre-baked until a PI film is formed. The PI film is a guide film or an alignment film, and the liquid crystal molecules in the liquid crystal display panel can be arranged in a pretilt angle. However, PI film in the film process, the shrinkage rate will change according to the heating temperature changes, so PI fluid is uniform, will directly affect the PI film formation film shrinkage rate is consistent, and thus affect the brightness of the LCD panel is uniform, whether there will be mura (screen spots).

The present application is a problem in that the film thickness is affected by the temperature at the time of film formation of the PI liquid, and a baking method, a device and a baking oven are proposed to solve the problem of uneven temperature during baking.

Of course, the present application can solve the problem of unevenness in the baking temperature occurring in other baking processes, in addition to the problem of uneven heating of the PI liquid during film formation, for example, the baking process of the photoresist is not limited to solving only the problem of uneven heating in the PI film formation process.

Figure 1:
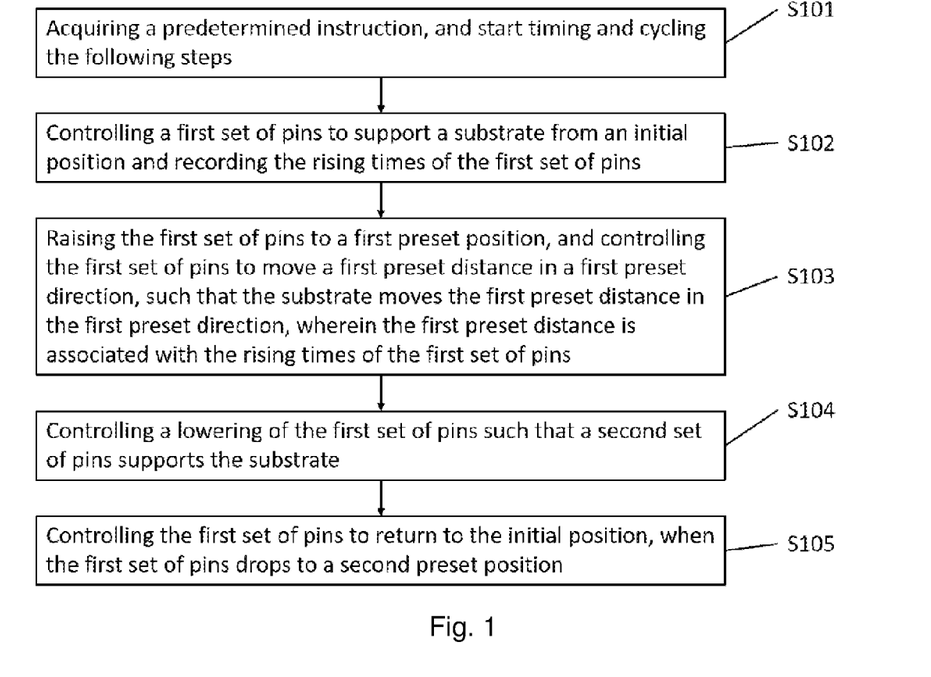
FIG. 1 is a schematic flow diagram of an implementation process of the baking method provided in the embodiments of the present application.

FIG. 1 is a schematic flow diagram of an implementation process of the baking method provided in the examples of the present application. The method shown in the figure may include the following steps:

Step S101: acquiring a predetermined instruction, and start timing and cycling the following steps.

The predetermined instruction refers to an instruction of start baking, and the start timing refers to start timing when acquired the instruction of start baking. The execution of the following steps means that the execution of step S102 to step S105 is performed and continues from step S102.

Step S102: controlling a first set of pins to support a substrate from an initial position and recording the rising times of the first set of pins.

The initial position may refer to a position where the first set of pins is not in contact with the substrate, wherein the substrate is supported by the second set of pins. It is also possible to set the first set of pins to return to the initial position by a button on the baking oven before the baking process is performed.

In a particular application, the initial value of the rising times of the first set of pins may be set to 0, the first set of pins is raised once, the rising times is increased by 1. In the practical application can also be set to the first set of pins cycle once from the initial position after the rise, shift, drop, and then back to the initial position, it will automatically add the cycling times of the first set of pins plus 1. Of course, it may further plus 1 when shift once or plus 1 when drop once.

Step S103: raising the first set of pins to a first preset position, and controlling the first set of pins to move a first preset distance in a first preset direction, such that the substrate moves the first preset distance in the first preset direction, wherein the first preset distance is associated with the rising times of the first set of pins.

The first preset position means that the first set of pins is raised to a position capable of supporting the substrate, the substrate being no longer in contact with the second set of pins when the first set of pins is in the first preset position.

Figure 2:
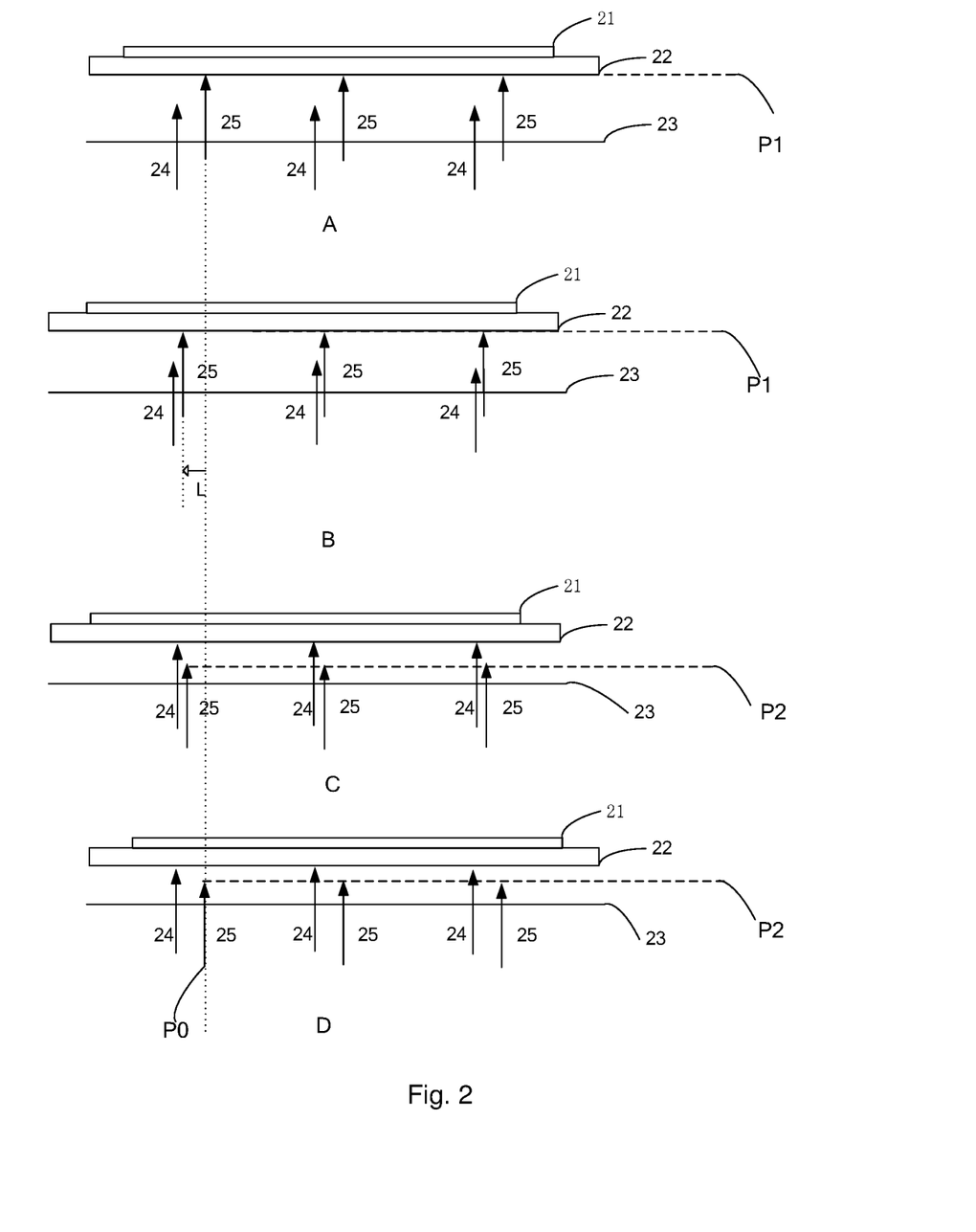
FIG. 2 is a schematic diagram of the position of the first set of pins during the baking process provided by the embodiments of the present application.

As shown in FIG. 2, in one embodiment, the PI liquid 21 is uniformly applied to the glass substrate 22, the hot plate 23 is located below the glass substrate 22, the second set of pins 24 and the first set of pins 25 are mounted on the hot plate 23. The first set of pins 25 is movable up and down and left and right.

FIG. 2-A shows that the first set of pins 25 rises to the first preset position P1. At this time, the glass substrate 22 is supported by the first set of pins 25, and the glass substrate 22 is separated from the second set of pins 24.

FIG. 2-B shows that the first set of pins 25 moves the first preset distance L in the first preset direction to cause the glass substrate 22 to move the first preset distance L in the first preset direction.

In a particular application, the first preset distance associated with the rising times of the first set of pins is:

$$L_i = x, (i=1)$$

$$L_i = 2x, (i=2,3,4,\ldots)$$

Wherein $L_i$ represents the first preset distance, and $i$ represents the rising times of the first set of pins.

For example, when the rising times of the first set of pins is 1, the first set of pins is controlled to move x millimeters in the first preset direction; when the rising times of the first set of pins is 2, 3, 4, ..., n−1, n, the first set of pointers is controlled to move 2 x mm in the first preset direction. Where n is any natural number greater than 1. Of course, in actual application can also be set to the first preset distance of the unit for other distance measurement units; it is also possible to set other correspondence relationship between the first preset distance and the rising times of the first set of pins, for example, the first move x, the second move 2 x, the third move x. It may also set the distance of each move are equal, do not limit here.

Step S104: controlling a lowering of the first set of pins such that a second set of pins supports the substrate.

In a particular application, the first set of pins is a movable pins group, the second set of pins may be a pins group that cannot be moved; the first set of pins and the second set of pins have a heating function; can also be set to the first group of pins and the second group of pins only one group has a heating function.

Step S105: controlling the first set of pins to return to the initial position, when the first set of pins drops to a second preset position.

Referring to FIG. 2, in one embodiment, the FIG. 2-C shows that the first set of pins 25 is lowered to a second preset position P2 such that the second set of pins 24 supports the glass substrate 22.

The second preset position means that the first set of pins drops to no longer be in contact with the substrate, the substrate being supported by the second set of pins.

In a particular application, the distance of the first set of pins raising from the initial position to the first preset position may be equal to a dropping distance of the first set of pins dropping from the first preset position to the second preset position.

Referring to FIG. 2, in one embodiment, FIG. 2-D shows that the first set of pins 25 returns to the initial position P0.

In a particular application, the second set of pins may be a pins group capable of moving up and down. The second set of pins can be controlled to control the second set of pins to support the substrate when the first set of pins is controlled to fall.

In a particular application, it is also possible to control the lowering of the second set of pins so that the first set of pins supports the substrate; controlling the first set of pins to move a first predetermined distance from an initial position to a first preset direction to cause the substrate to move a first predetermined distance in a first preset direction; controlling the second set of pins to support the substrate; and controlling the first set of pins to return to the initial position.

Figure 3:
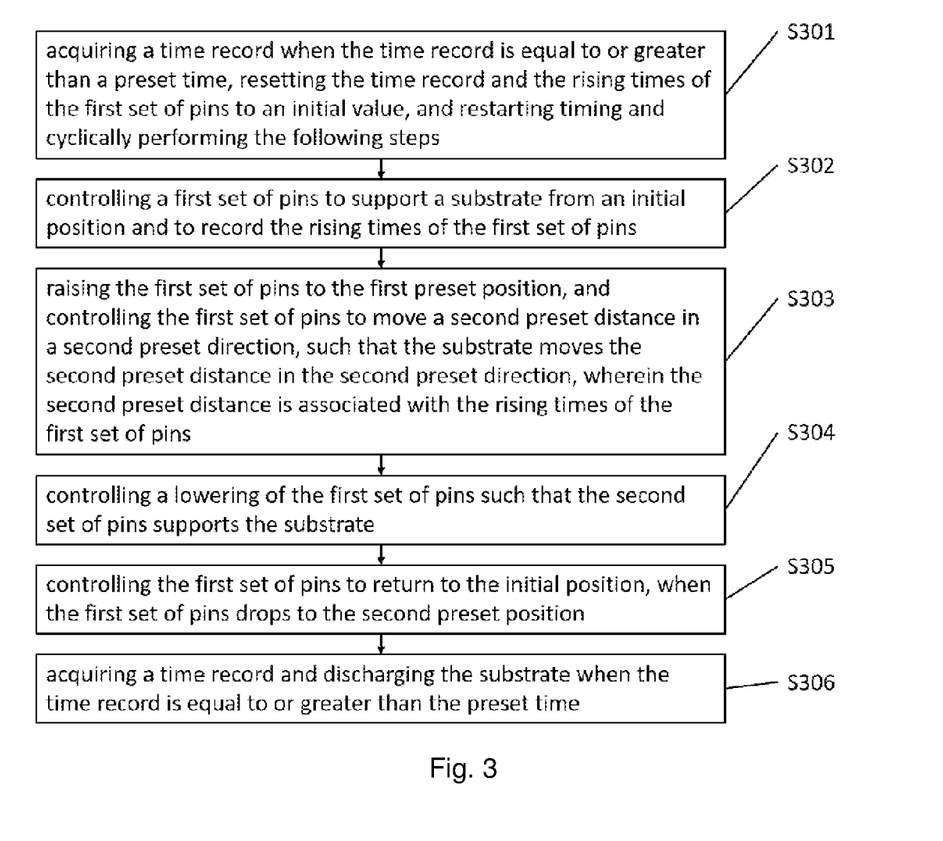
FIG. 3 is a schematic flow diagram of an implementation process of the baking method provided in the examples of the present application.

In one embodiment, referring to FIG. 3, after the first set of pins returns to the initial position, the method further includes:

Step S301: acquiring a time record when the time record is equal to or greater than a preset time, resetting the time record and the rising times of the first set of pins to an initial value, and restarting timing and cyclically performing the following steps.

In a particular application, the preset time may be ½ of the baking time. The baking time is the total time from the start of the counting to the end of the baking. The baking time may be artificially set.

In a particular application, the time record and the rising times of the first set of pins are reset to an initial value, which may be zero.

In the specific application, after acquiring the time, if the time record is equal to or greater than a preset time, the time record and the rising times of the first set of pins are reset to an initial value, the counting is started and the following steps are executed cyclically. The cyclically execution of the following steps means that the steps S302 to S306 are sequentially performed, and the execution proceeds from step S302. If the time record is less than the preset time, the execution proceeds from step S102.

In a specific embodiment, the substrate is set to ½ the baking time in the first preset direction and then the ½ baking time is moved in the second preset direction. It is necessary to continue from step S102 if the time record is less than the preset time indicating that the first set of pins has not moved ½ baking time in the first preset direction. If the time record is equal to or greater than the preset time, indicating that the first set of pins has moved ½ baking time in the first preset direction, it is necessary to continue to move in the opposite direction. It is necessary to reset the time record and the rising times of the first set of pins to the initial value, to re-position the current position as the starting point in the second preset direction, and then start the timing and execute from step S302.

In the particular application, it is also possible to obtain the rising times of the first set of pins, and if the number of times is equal to the preset number of times, the number of times of the first set of pin ascensions is reset to the initial value and the following steps are executed cyclically.

Step S302: controlling a first set of pins to support a substrate from an initial position and to record the rising times of the first set of pins.

This step is consistent with step S102, and may be described in detail with reference to step S102.

Step S303: raising the first set of pins to the first preset position, and controlling the first set of pins to move a second preset distance in a second preset direction, such that the substrate moves the second preset distance in the second preset direction, wherein the second preset distance is associated with the rising times of the first set of pins.

In the specific application, the initial value being 0 and the second preset distance associated with the rising times of the first set of pins is:

$$R_i=x, (i=1)$$

$$R_i=2x, (i=2,3,4,\ldots)$$

wherein $R_i$ represents the second preset distance, and i represents the rising times of the first set of pins.

For example, when the rising times of the first set of pins is 1, the first set of pins is controlled to x move millimeters in the first preset direction; when the rising times of the first set of pins is 2, 3, 4, ..., n−1, n, the first set of pointers is controlled to move 2 x mm in the first preset direction. Where n is any natural number greater than 1. Of course, in actual application can also be set to the first preset distance of the unit for other distance measurement units; it is also possible to set other correspondence relationship between the first preset distance and the rising times of the first set of pins. For example, if the first move x, the second move 2 x, the third move x in the first preset direction, the first move x, the second move 2 x, the third move x in the first preset direction in the second preset direction. In order to prevent the same pin and the substrate at the same location repeated contact or prolonged contact. It is also possible to set the distances to be moved each time in the second preset direction, and the specific movement distance is not limited thereto. It is to be ensured that the distance from the last movement in the first preset direction is different from the distance from the first movement in the second preset direction.

In a particular application, the direction in which the second preset direction is opposite to the first preset direction may refer to a first preset direction that is horizontally leftward and the second preset direction is horizontally to the right. Or the first preset direction is horizontally rightward, and the second preset direction is horizontally leftward. It may also be noted that the first preset direction is horizontally forward, the second preset direction is horizontally backward, or the first preset direction is horizontally backward, and the second preset direction is horizontally forward. The horizon may refer to parallel to the substrate.

Step S304: controlling a lowering of the first set of pins such that the second set of pins supports the substrate.

Step S305: controlling the first set of pins to return to the initial position, when the first set of pins drops to the second preset position.

Step S306: acquiring a time record and discharging the substrate when the time record is equal to or greater than the preset time.

In a particular application, in the controlling the first set of pins return to the initial position and acquiring the time record, if the time record is equal to or greater than the preset time, the substrate is discharged, the timing is ended and the baking is completed; if the time record is less than the preset time, step S302 is continued.

As can be seen from the above, steps S102 to S105 and steps S302 to S305 are actually a process in which the substrate is moved in the opposite direction. Step S102 to S105 are cyclically performed in the process of moving in the first preset direction, and after each step S105 is executed, it is also necessary to execute step S301 (actually, the steps S102, S103, S104, S105, and S301 are executed in the loop) to determine whether or not the preset time is moved to the first preset direction. If steps S102 to S105 are not reached by the preset time, if the preset time is moved in the first preset direction, the timer is restarted and moved in the opposite direction, and it is necessary to execute steps S302 to S305. Also, after each step S305 is executed, it is necessary to perform step S306 (actually, the cyclic execution steps S302, S303, S304, S305, S306) to determine whether or not the preset time is moved to the second preset direction. If the preset time is not reached, steps S302 to S305 are performed, and if the preset time is shifted in the second preset direction, the substrate is discharging.

In this way, the time at which one of the contact points in the liquid crystal display panel comes into contact with a certain pin is that the total baking time is divided by the total number of times of movement.

The baking method described in the examples of the present application is acquiring a predetermined instruction, starting timing and cycling the following steps. Controlling a first set of pins to support a substrate from an initial position and recording the rising times of the first set of pins. Raising the first set of pins to a first preset position, and controlling the first set of pins to move a first preset distance in a first preset direction, such that the substrate moves the first preset distance in the first preset direction, wherein the first preset distance is associated with the rising times of the first set of pins. Controlling the lowering of the first set of pins such that a second set of pins supports the substrate. And controlling the first set of pins to return to the initial position, when the first set of pins drops to a second preset position.

It is to be understood that the magnitude of the sequence numbers of the steps in the above embodiments does not imply that the order of execution of the sequences should be determined in terms of their functions and intrinsic logic, and should not be construed as limiting the implementation of the embodiments of the present application.

Figure 4:
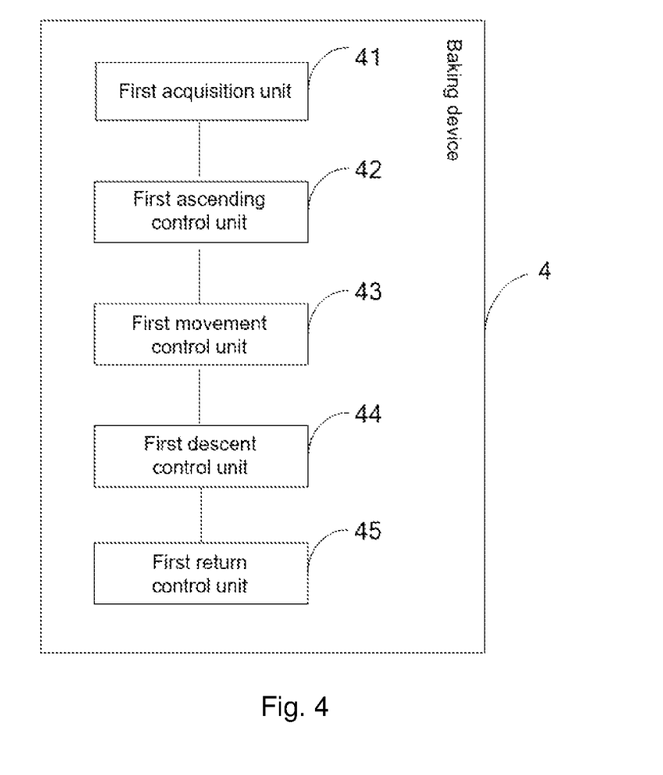
FIG. 4 is a schematic diagram of a baking device according to an embodiment of the present application.

FIG. 4 is a schematic block diagram of the baking device provided in the present embodiment, and only a portion associated with the embodiment of the present application is shown for convenience of explanation. The baking device includes:

a first acquisition unit 41 for acquiring a predetermined instruction, and starting timing and controlling the following unit cycle operation:

a first ascending control unit 42 for controlling a first set of pins to support a substrate from an initial position and to record the rising times of the first set of pins.

A first movement control unit 43 for raising the first set of pins to a first preset position, and controlling the first set of pins to move a first preset distance in a first preset direction, such that the substrate moves the first preset distance in the first preset direction, wherein the first preset distance is associated with the rising times of the first set of pins.

In the specific application, the first preset distance associated with the rising times of the first set of pins is:

$$L_i=x, (i=1)$$

$$L_i=2x, (i=2,3,4, \dots)$$

wherein $L_i$ represents the first preset distance, and i represents the rising times of the first set of pins.

A first descent control unit 44 for controlling a lowering of the first set of pins such that a second set of pins supports the substrate.

A first return control unit 45 for controlling the return of the first set of pins to the initial position when the first set of pins drops to the second preset position.

Figure 5:
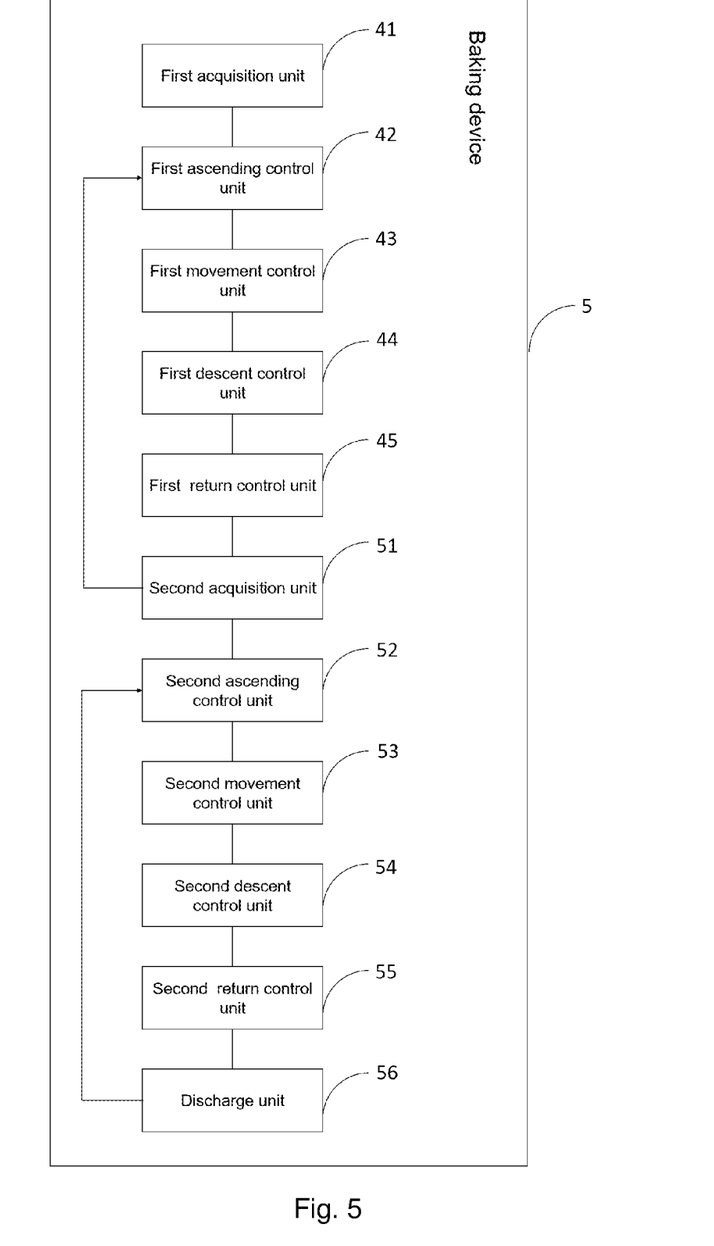
FIG. 5 is a schematic diagram of a baking device according to an embodiment of the present application.

In one embodiment, shown in FIG. 5, the baking device further includes:

a second acquisition unit 51 for acquiring a time record after the first set of pins returning to the initial position, when the time record is equal to or greater than a preset time, resetting the time record and the rising times of the first set of pins to an initial value, and restarting timing and cyclically performing the following steps:

a second rising control unit 52 for controlling the first set of pins to support the substrate from the initial position and recording the rising times of the first set of pins.

A second movement control unit 53 for raising the first set of pins to the first preset position, and controlling the first set of pins to move a second preset distance in a second preset direction, such that the substrate moves the second preset distance in the second preset direction, wherein the second preset distance is associated with the rising times of the first set of pins.

In the specific application, the initial value being 0 and the second preset distance associated with the rising times of the first set of pins is:

$$R_i=x, (i=1)$$

$$R_i=2x, (i=2,3,4, \dots)$$

wherein $R_i$ represents the second preset distance, and i represents the rising times of the first set of pins.

A second descent control unit 54 for controlling a lowering of the first set of pins such that the second set of pins supports the substrate.

A second return control unit 55 for controlling the return of the first set of pins to the initial position when the first set of pins drops to the second preset position.

And a discharge control unit 56 for acquiring a time record for discharging the substrate when the time record is equal to or greater than the preset time.

In a particular application, the preset time is ½ of the baking time.

It will be apparent to those skilled in the art that, for the sake of convenience and simplicity of description, only the division of the above functional units is illustrated. In practical applications, the above functional assignments may be performed by different functional units as needed, i.e. dividing the internal structure of the device into different functional units to complete all or part of the functions described above. Each of the functional units in the embodiment may be integrated in one processing unit or may be physically separate from each unit, or two or more units may be integrated in one unit. The above-mentioned integrated unit can be implemented either in the form of hardware or in the form of software functional units. In addition, the specific names of the functional units are merely for ease of mutual distinction and are not intended to limit the scope of the present application. The specific operation of the unit in the above system can be referred to the corresponding procedure in the foregoing embodiment of the method and will not be described here.

Figure 6:
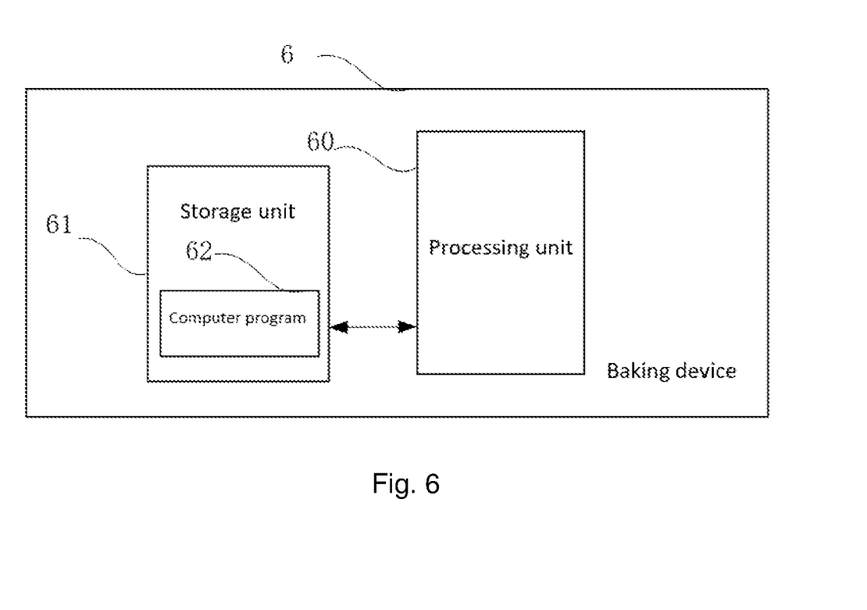
FIG. 6 is a schematic diagram of a baking device according to an embodiment of the present application.

FIG. 6 is a schematic diagram of a baking device according to an embodiment of the present application. As shown in FIG. 6, the baking device 6 of the embodiment includes: a processing unit 60, a storage unit 61, and a computer program 62 stored in the storage unit 61 and operable on the processing unit 60, for example, a baking method. The processing unit 60 executes the steps in the respective baking method embodiments, such as steps S101 to S105 shown in FIG. 1, when the computer program 62 is executed. Alternatively, when the processing unit 60 executes the computer program 62, the functions of the units in the above-described apparatus embodiments, such as the functions of the units 41 to 45 shown in FIG. 4, are realized.

For example, the computer program 62 may be divided into one or more units, the one or more units being stored in the storage unit 61 and executed by the processing unit 60 to complete the present application. The one or more units may be a series of computer program instructions that can be used to describe the execution of the computer program 62 in the baking device 6, which is capable of performing a particular function. For example, the computer program 62 may be divided into a first acquisition unit, a first ascending control unit, a first movement control unit, a first descent control unit, and a first return control unit (the unit in the virtual device). The specific functions of the units are as follows:

a first acquisition unit for acquiring a predetermined instruction, and starting timing and controlling the following unit cycle operation:

a first ascending control unit for controlling a first set of pins to support a substrate from an initial position and to record the rising times of the first set of pins.

a first movement control unit for raising the first set of pins to a first preset position, and controlling the first set of pins to move a first preset distance in a first preset direction, such that the substrate moves the first preset distance in the first preset direction, wherein the first preset distance is associated with the rising times of the first set of pins.

In a particular application, the first preset distance associated with the rising times of the first set of pins is:

$$L_i=x, (i=1)$$

$$L_i=2x, (i=2,3,4, \dots)$$

Wherein $L_i$ represents the first preset distance, and i represents the rising times of the first set of pins.

A first descent control unit for controlling a lowering of the first set of pins such that a second set of pins supports the substrate.

A first return control unit for controlling the return of the first set of pins to the initial position when the first set of pins drops to the second preset position.

In one embodiment, the baking device further includes:

A second acquisition unit for acquiring a time record after the first set of pins returning to the initial position, when the time record is equal to or greater than a preset time, resetting the time record and the rising times of the first set of pins to an initial value, and restarting timing and cyclically performing the following steps:

A second rising control unit for controlling the first set of pins to support the substrate from the initial position and recording the rising times of the first set of pins.

A second movement control unit for raising the first set of pins to the first preset position, and controlling the first set of pins to move a second preset distance in a second preset direction, such that the substrate moves the second preset distance in the second preset direction, wherein the second preset distance is associated with the rising times of the first set of pins.

In the specific application, the initial value being 0 and the second preset distance associated with the rising times of the first set of pins is:

$$R_i = x, (i=1)$$

$$R_i = 2x, (i=2,3,4, \ldots )$$

wherein $R_i$ represents the second preset distance, and i represents the rising times of the first set of pins.

A second descent control unit for controlling the lowering of the first set of pins such that the second set of pins supports the substrate.

A second return control unit for controlling the return of the first set of pins to the initial position when the first set of pins drops to the second preset position.

And a discharge control unit for acquiring a time record and discharging the substrate when the time record is equal to or greater than the preset time.

In a particular application, the preset time is ½ of the baking time.

The baking device 6 may be a computing device such as a desktop computer, a notebook, a palmtop computer, and a cloud server. The baking device may include, but is not limited to, a processing unit 60, a storage unit 61. It will be understood by those skilled in the art that FIG. 6 is merely an example of the baking device 6 and does not constitute a limitation on the baking device 6. May include more or fewer components than illustrated, or combine certain components, or different components, such as the baking device, may also include input and output devices, network access devices, buses, and the like.

The processing unit 60 may be a central processing unit (CPU), and may be other general-purpose processors, digital signal processer (DSP), application specific integrated circuit (ASIC), field-programmable gate array (FPGA) or other programmable logic devices, discrete gate or transistor logic devices, discrete hardware components, and the like. The general-purpose processor may be a microprocessor, or the processor may also be any conventional processor.

The storage unit 61 may be an internal storage unit of the baking device 6, such as a hard disk or a memory of the baking device 6. The storage unit 61 may be an external storage unit of the baking device 6, such as a plug-in hard disk, a smart media card (SMC), a secure digital (SD) card, a flash card, and the like provided on the baking device 6. Further, the storage unit 61 may also include both the internal storage unit of the baking device 6 and the external storage device. The storage unit 61 is used to store the computer program and other programs and data required for the oven. The storage unit 61 may also be used to temporarily store data that has been output or to be output. In the above embodiments, the descriptions of the respective embodiments each have a focus, and portions not detailed or documented in one embodiment may be found in the description of other embodiments.

Those of ordinary skill in the art will appreciate that the elements and algorithm steps of each of the examples described in connection with the embodiments disclosed herein can be implemented in electronic hardware, or in combination with computer software and electronic hardware. Whether these functions are implemented in hardware or software depends on the specific application and design constraints of the technical solution. The skilled artisan may use different methods to implement the described functions for each particular application, but such implementations should not be considered beyond the scope of the present application.

In the embodiments provided herein, it should be understood that the disclosed apparatus/terminal apparatus and method may be implemented in other ways. For example, the device/terminal device embodiment described above is merely illustrative, for example, the division of the module or unit is only a logical function division, and there may be an additional division in the actual implementation. For example, multiple units or components may be combined or may be integrated into another system, or some features may be ignored or not performed. In other respects, the coupling or direct coupling or communication connection shown or discussed may be an indirect coupling or communication connection through some interface, device or unit, which may be electrical, mechanical, or otherwise.

The units described as the separation means may or may not be physically separate, and the components shown as units may or may not be physical units, i.e., may be located in one place or may be distributed over a plurality of network elements. The part or all of the elements may be selected according to the actual needs to achieve the object of the present embodiment.

In addition, the functional units in the various embodiments of the present application may be integrated in one processing unit, or each unit may be physically present, or two or more units may be integrated in one unit. The above-mentioned integrated unit can be implemented either in the form of hardware or in the form of software functional units.

The integrated modules/units may be stored in a computer-readable storage medium if they are implemented in the form of software functional units and are sold or used as standalone products. Based on this understanding, the present application implements all or part of the processes in the method of the above-described embodiments, and may also be executed by a computer program to instruct the associated hardware. The computer program may be stored in a computer readable storage medium, when executed by a processor, may implement the steps of the various method embodiments described above. Wherein the computer program includes computer program code, which may be a source code form, an object code form, an executable file, or some intermediate form, and the like. The computer-readable medium may include any entity or device capable of carrying the computer program code, a recording medium, a USB, a mobile hard disk, a disk, a CD, a computer memory, a read only memory (ROM), a random-access memory (RAM), an electrical carrier signal, a telecommunications signal, and a software distribution medium. It is to be noted that the contents of the computer-readable medium may be appropriately increased or decreased in accordance with the requirements of legislative and patent practice in the jurisdiction. For example, in some jurisdictions, according to legislative and patent practice, computer-readable media do not include electrical carrier signals and telecommunications signals.

The above-described embodiments are merely illustrative of the technical solutions of the present application and are not intended to be limiting thereof. While the present application has been described in detail with reference to the foregoing embodiments, it will be understood by those of ordinary skill in the art that it is still possible to modify the technical solutions recited in the foregoing embodiments or to equivalently replace some of the technical features therein. And that these modifications or substitutions do not depart from the spirit and scope of the technical solutions of the various embodiments of the present application and are intended to be included within the scope of the present application.

What is claimed is:

1. A baking method comprising the steps of:
  acquiring a predetermined instruction, and starting timing and cycling the following steps:
  controlling a first set of pins to support a substrate from an initial position and recording rising times of the first set of pins;
  raising the first set of pins to a first preset position, and controlling the first set of pins to move a first preset distance in a first preset direction, such that the substrate moves the first preset distance in the first preset direction, wherein the first preset distance is associated with the rising times of the first set of pins;
  controlling a lowering of the first set of pins such that a second set of pins supports the substrate; and
  controlling the first set of pins to return to the initial position, when the first set of pins drops to a second preset position.

2. The baking method according to claim 1, wherein the predetermined instruction refers to an instruction of start baking, and the starting timing refers to start timing when acquired the instruction of start baking.

3. The baking method according to claim 1, wherein a distance of the first set of pins raising from the initial position to the first preset position is equal to a dropping distance of the first set of pins dropping from the first preset position to the second preset position.

4. The baking method according to claim 1, wherein after the first set of pins returning to the initial position, the method further comprises:
  acquiring a time record, when the time record is equal to or greater than a preset time, resetting the time record and the rising times of the first set of pins to an initial value, and restarting timing and cyclically performing the following steps:
  controlling the first set of pins to support the substrate from the initial position and recording the rising times of the first set of pins;
  raising the first set of pins to the first preset position, and controlling the first set of pins to move a second preset distance in a second preset direction, such that the substrate moves the second preset distance in the second preset direction, wherein the second preset distance is associated with the rising times of the first set of pins;
  controlling the lowering of the first set of pins such that the second set of pins supports the substrate;
  controlling the first set of pins to return to the initial position, when the first set of pins drops to the second preset position;
  acquiring the time record, and discharging the substrate when the time record is equal to or greater than the preset time.

5. The baking method according to claim 4, wherein the initial value being 0 and the second preset distance associated with the rising times of the first set of pins is:

$$R_i=x, (i=1)$$

$$R_i=2x, (i=2,3,4,\ldots)$$

wherein $R_i$ represents the second preset distance, and i represents the rising times of the first set of pins.

6. The baking method according to claim 4, wherein the preset time is ½ of a baking time.

7. The baking method according to claim 1, wherein the first preset distance associated with the rising times of the first set of pins is:

$$L_i=x, (i=1)$$

$$L_i=2x, (i=2,3,4,\ldots)$$

wherein $L_i$ represents the first preset distance, and i represents the rising times of the first set of pins.

* * * * *